(12) United States Patent
Wang (10) Patent No.: US 9,661,888 B2
(45) Date of Patent: May 30, 2017

(54) METHOD FOR FORMING THERMOPLASTIC COMPOSITES

(71) Applicant: Shui Mu Wang, Taichung (TW)

(72) Inventor: Shui Mu Wang, Taichung (TW)

(73) Assignee: Chaei Hsin Enterprise Co., Ltd., Taichung (TW)

( * ) Notice: Subject to any disclaimer, the term of this patent is extended or adjusted under 35 U.S.C. 154(b) by 322 days.

(21) Appl. No.: 13/908,043

(22) Filed: Jun. 3, 2013

(65) Prior Publication Data

US 2014/0353883 A1   Dec. 4, 2014

(51) Int. Cl.
*B29C 51/10* (2006.01)
*A41H 43/04* (2006.01)
*B29C 65/18* (2006.01)
*B29C 65/48* (2006.01)
*B29C 65/00* (2006.01)
(Continued)

(52) U.S. Cl.
CPC ............. *A41H 43/04* (2013.01); *B29C 65/18* (2013.01); *B29C 65/4815* (2013.01); *B29C 65/544* (2013.01); *B29C 66/00145* (2013.01); *B29C 66/1122* (2013.01); *B29C 66/30326* (2013.01); *B29C 66/472* (2013.01); *B29C 66/712* (2013.01); *B29C 66/729* (2013.01); *B29C 66/7392* (2013.01); *B29C 66/73115* (2013.01); *B29C 66/81241* (2013.01); *B29C 66/81455* (2013.01); *B29C 66/82661* (2013.01); *B29C 66/8322* (2013.01); *B32B 37/1018* (2013.01); *B32B 38/06* (2013.01); *B29C 66/71* (2013.01); *B29C 66/7294* (2013.01); *B29C 66/7332* (2013.01); *B29C 66/7352* (2013.01); *B29C 66/8122* (2013.01); *B29C 2793/0081* (2013.01); *B29K 2995/0065* (2013.01); *B29L 2031/4814* (2013.01); *B29L 2031/50* (2013.01); *B32B 2305/18* (2013.01)

(58) Field of Classification Search
None
See application file for complete search history.

(56) References Cited

U.S. PATENT DOCUMENTS 3,817,806 A * 6/1974 Anderson et al. ............ 156/161
4,781,569 A * 11/1988 Kinugasa et al. ............ 425/504
(Continued)

FOREIGN PATENT DOCUMENTS

TW   1266693 B   11/2006
TW   1269703 B   1/2007

*Primary Examiner* — Monica Huson
(74) *Attorney, Agent, or Firm* — Alan D. Kamrath; Kamrath IP Lawfirm, P.A.

(57) ABSTRACT

A method for forming thermoplastic composites includes: (a). cutting a thermoplastic film and a cloth material, with the thermoplastic film including a surface layer and an adhesive layer, and with a melting point of the surface layer higher than the adhesive layer; (b). placing the thermoplastic film on a platform of a molding machine, facing the adhesive layer upwardly, and covering the cloth material on the thermoplastic film, with the platform including a plurality of channels defined therein, a plurality of concave and convex patterns arranged on a top surface thereof, and plural pores evenly formed on the top surface thereof and communicating with the plurality of channels; and (c). heating the thermoplastic film by using a heating unit to melt the adhesive layer and to soften the surface layer.

16 Claims, 6 Drawing Sheets

(51) Int. Cl.
   *B29C 65/54*    (2006.01)
   *B32B 37/10*    (2006.01)
   *B32B 38/06*    (2006.01)
   *B29L 31/50*    (2006.01)
   *B29L 31/48*    (2006.01)

(56) References Cited

U.S. PATENT DOCUMENTS

| | | | |
|---|---|---|---|
| 6,093,272 A * | 7/2000 | Visconti et al. | 156/219 |
| 2001/0031597 A1 * | 10/2001 | Locatelli | 442/399 |
| 2006/0141240 A1 * | 6/2006 | Ota | B32B 1/00 |
| | | | 428/319.3 |
| 2009/0124150 A1 * | 5/2009 | Covelli et al. | 442/148 |

* cited by examiner

METHOD FOR FORMING THERMOPLASTIC COMPOSITES

FIELD OF THE INVENTION

The present invention relates to a method for forming thermoplastic composites in which cloth material and thermoplastic film are combined tighter to form the thermoplastic composites with a varying shape to produce shoes, purses, and hats further.

BACKGROUND OF THE INVENTION

A conventional method for forming thermoplastic composites is disclosed in TW Publication No. 1269703. The film layer, the thermoplastic film, and fabric are rolled by two rollers together to form three-dimensional patterns, but the three-dimensional patterns are not obvious.

Another conventional method for forming thermoplastic composites is disclosed in TW Publication No. 1266693. The cloth material and the thermoplastic film are hot pressed by an upper mold and a lower mild, yet concave and convex patterns on the upper mold and the lower mold are not three-dimensional obviously.

The present invention has arisen to mitigate and/or obviate the afore-described disadvantages.

SUMMARY OF THE INVENTION

The primary objective of the present invention is to provide a method for forming thermoplastic composites in which cloth material and thermoplastic film are combined tighter to form the thermoplastic composites with a varying shape to produce shoes, purses, and hats further.

To obtain the above objective, a method for forming thermoplastic composites according to a first embodiment of the present invention contains the steps of:

(a). cutting a thermoplastic film and a cloth material, with the thermoplastic film comprised of a surface layer and an adhesive layer, and with a melting point of the surface layer higher than the adhesive layer;

(b). placing the thermoplastic film on a platform of a molding machine, facing the adhesive layer upwardly, and covering the cloth material on the thermoplastic film, with the platform including a plurality of channels defined therein, a plurality of concave and convex patterns arranged on a top surface thereof, and plural pores evenly formed on the top surface thereof and communicating with the plurality of channels;

(c). heating the thermoplastic film by using a heating unit to melt the adhesive layer and to soften the surface layer, with air in the plurality of channels drawn by a vacuum unit, with a top surface of the cloth layer pressed by a pressing member, with the plural pores drawing the thermoplastic film and the cloth material downwardly, and with the pressing member pressing the cloth material, such that the adhesive layer of the thermoplastic film penetrates into the cloth material, such that the adhesive layer adheres with the cloth material, and such that the surface layer of the thermoplastic film corresponds to the plurality of concave and convex patterns of the platform, thus forming three-dimensional patterns.

To obtain the above objective, a method for forming thermoplastic composites according to a second embodiment of the present invention contains the steps of:

(a). cutting a thermoplastic film and a cloth material, with the thermoplastic film comprised of a surface layer and an adhesive layer, with a melting point of the surface layer higher than the adhesive layer;

(b). placing the cloth material on a platform of a molding machine, and then putting the adhesive layer of the thermoplastic film on the cloth material, with the platform including a plurality of channels rpm defined therein, and plural pores evenly formed on the top surface thereof and communicating with the plurality of channels;

(c). heating the thermoplastic film by using a heating unit to melt the adhesive layer, with air in the plurality of channels drawn by a vacuum unit, with a top surface of the thermoplastic film pressed by a pressing member, with the plural pores drawing the thermoplastic film and the cloth material downwardly, and with the pressing member pressing the thermoplastic film, such that the adhesive layer of the thermoplastic film penetrates into the cloth material.

DETAILED DESCRIPTION OF THE PREFERRED EMBODIMENTS

Figure 1:
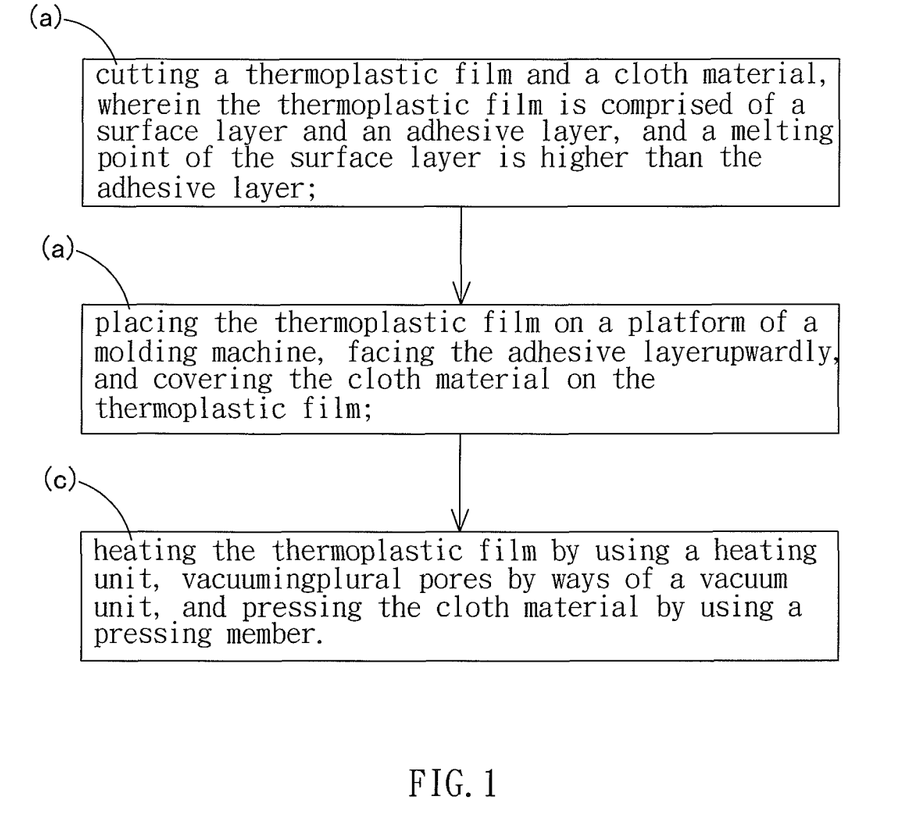
FIG. 1 is a flow chart of a method for forming thermoplastic composites according to a first embodiment of the present invention.
Figure 2:
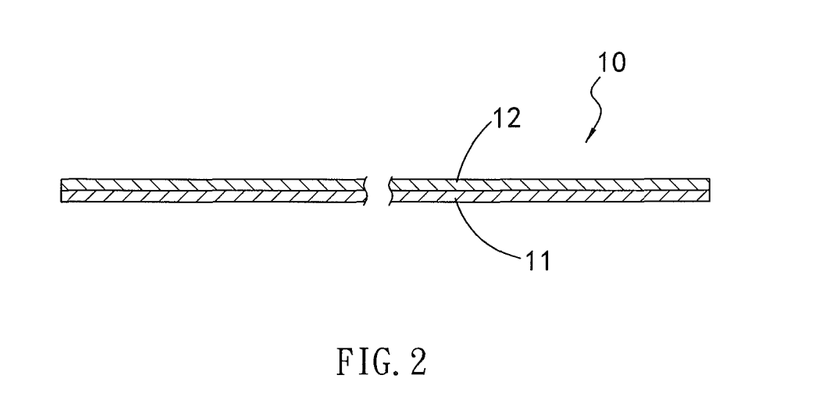
FIG. 2 is an amplified cross sectional view showing a thermoplastic film of the method for forming thermoplastic composites according to the first embodiment of the present invention.

With reference to FIGS. 1-5, a method for forming thermoplastic composites according to a first embodiment of the present invention contains the steps of:

(a). cutting a thermoplastic film 10 and a cloth material 20. A size of the thermoplastic film 10 is less than that of the cloth material 20, and the thermoplastic film 10 is made of thermoplastic polymeric material and colorant by ways of an extruder. The thermoplastic polymeric material is selected from thermoplastic polyurethane (TPU) and styrene butadiene rubber (SBR), thermoplastic polyurethane (TPU) and styrene ethylene butylene styrene (SEBS), thermoplastic polyurethane (TPU) and thermoplastic rubber (TPR), thermoplastic polyurethane (TPU) and ethylene propylene diene monomer (EPDM), thermoplastic polyurethane (TPU) and thermoplastic polyurethane (TPU) hot melt adhesives and thermoplastic polyurethane (TPU) and Nylon elastomer. A color is printed, coated or surface sandwiched on the thermoplastic film 10. A thickness of the thermoplastic film 10 is 0.05 to 2.5 mm. The thermoplastic film 10 is comprised of a surface layer 11 and an adhesive layer 12 (as shown in FIG. 2), and a melting point of the surface layer 11 is 5° C. higher than the adhesive layer 12. The cloth material is selected from woven or knitted fabrics, or non-woven and sandwich mesh.

Figure 3:
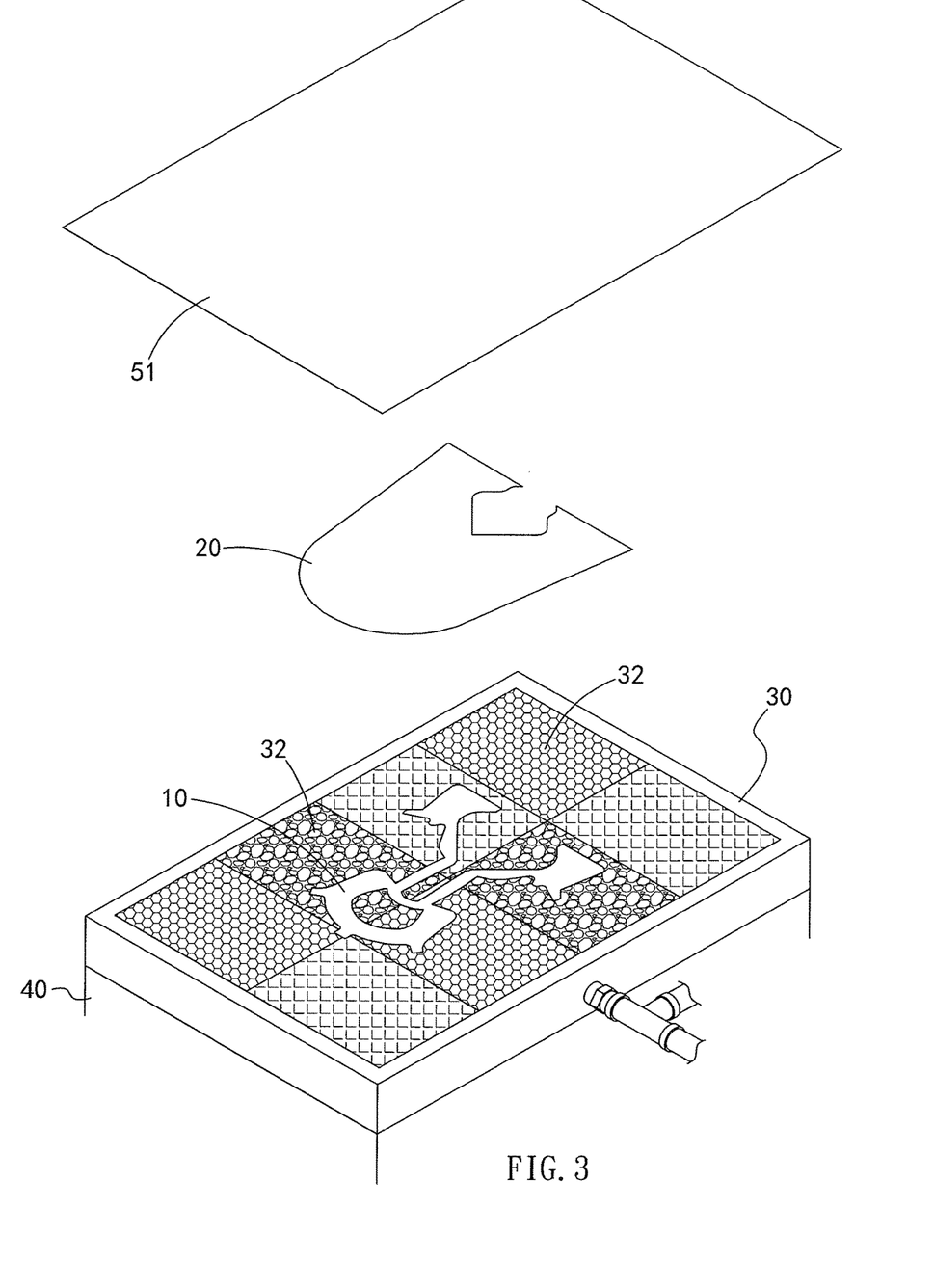
FIG. 3 is a perspective view showing the operation of the method for forming thermoplastic composites according to the first embodiment of the present invention.

(b). placing the thermoplastic film 10 on a platform 30 of a molding machine, facing the adhesive layer 12 upwardly, and covering the cloth material 20 on the thermoplastic film 10 (as illustrated in FIG. 3). The platform 30 includes a plurality of channels 31 defined therein, a plurality of concave and convex patterns 32 arranged on a top surface thereof, and plural pores 33 evenly formed on the top surface thereof and communicating with the plurality of channels 31. The concave and convex patterns 32 are the same or varying, and a diameter of each pore 33 is 0.001 mm.

Figure 4:
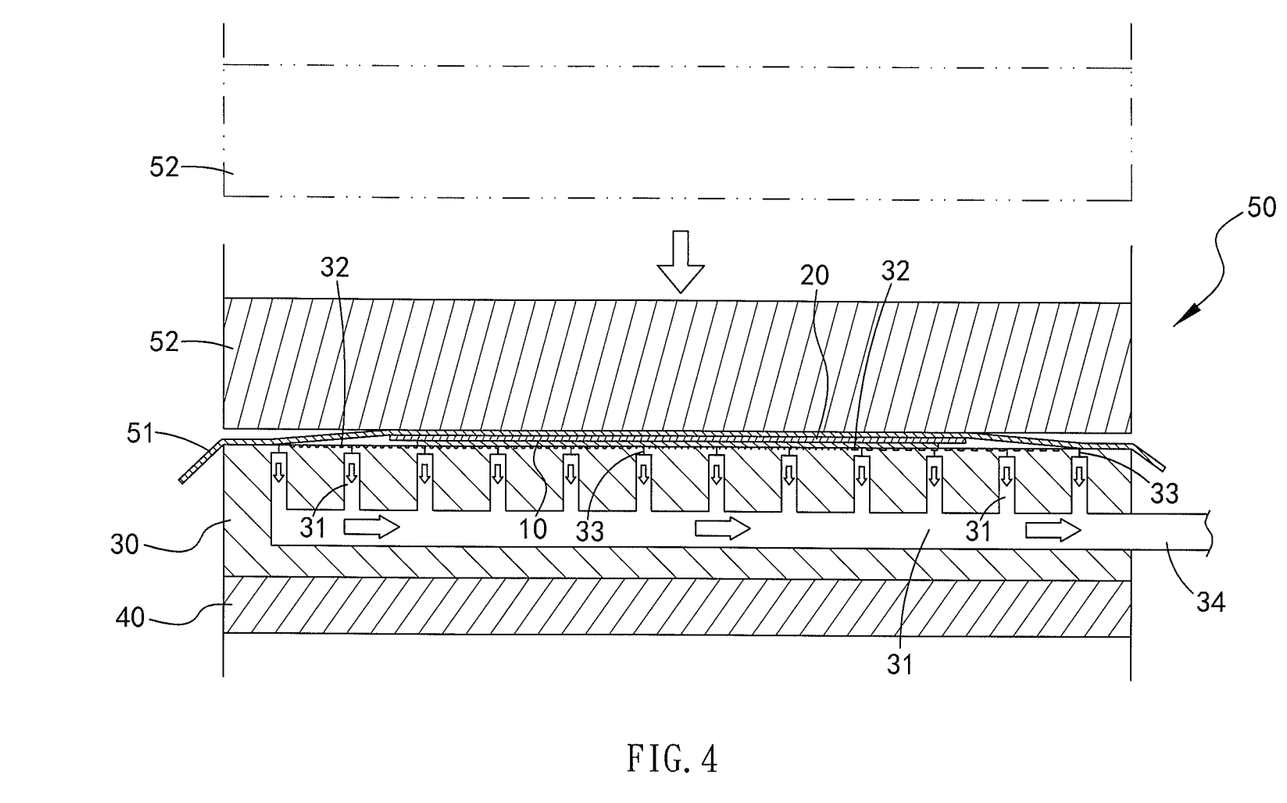
FIG. 4 is a cross sectional view showing the operation of the method for forming thermoplastic composites according to the first embodiment of the present invention.

(c). heating the thermoplastic film 10 by using a heating unit 40 to melt the adhesive layer 12 and to soften the surface layer 11. Air in the plurality of channels 31 is drawn by a vacuum unit 34, and a top surface of the cloth material 20 is pressed by a pressing member 50. The pressing member 50 has an air insulation film 51 and a press mold 52. A melting point of the air insulation film 51 is higher than that of the surface layer 11. The air insulation film 51 is made of rubber or silicone, and the air insulation film 51 is covered on the platform 30 and the cloth material 20, and the press mold 52 is pressed on the air insulation film 51.

Figure 5:
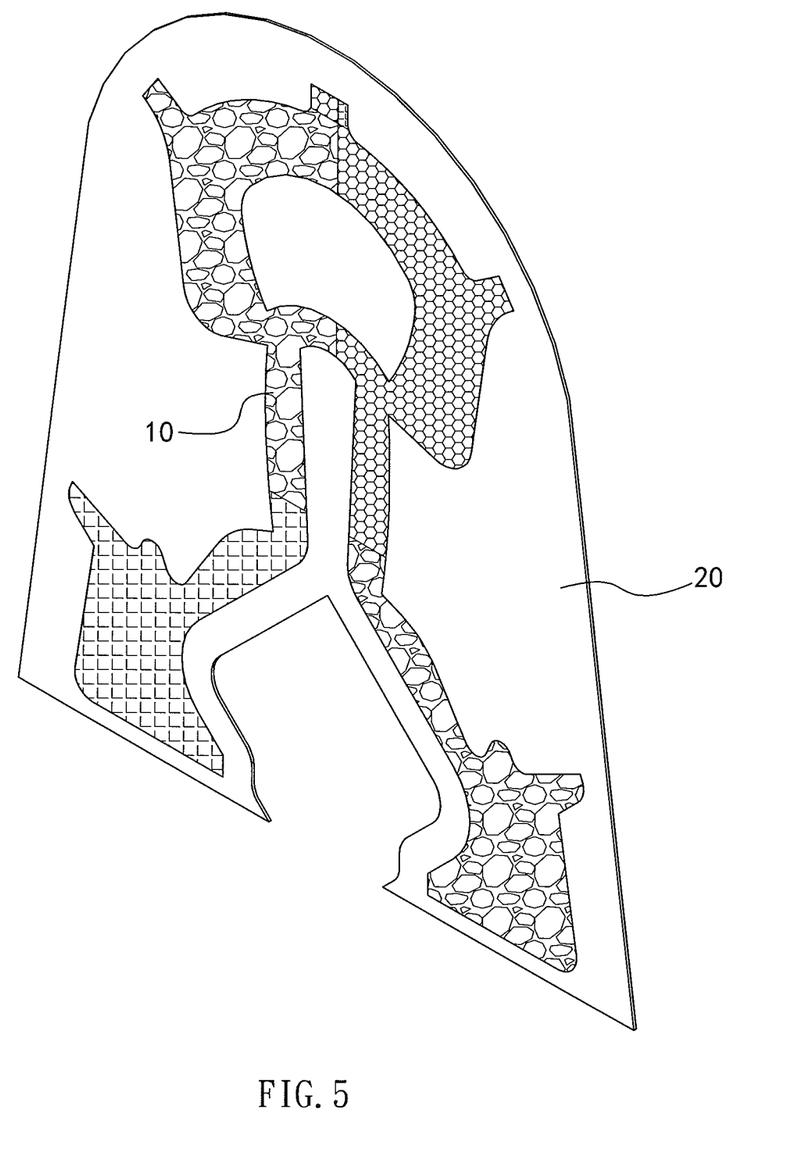
FIG. 5 is a perspective view showing a finished product formed by the method for forming thermoplastic composites according to the first embodiment of the present invention.

Thereby, when the vacuum unit 34 operates, a pressure between the top surface of the platform 30 and the air insulation film 51 is lower than atmospheric pressure and is a negative pressure to draw the air insulation film 51 downwardly. Thus, the air insulation film 51 presses the cloth material 20, and the press mold 52 presses the air insulation film 51, such that the adhesive layer 12 of the thermoplastic film 10 penetrates into the cloth material 20. Hence, the adhesive layer 12 adheres with the cloth material 20. In addition, the plural pores 33 draw the thermoplastic film 10 and the cloth material 20 downwardly, such that the surface layer 11 of the thermoplastic film 10 corresponds to the plurality of concave and convex patterns 32 of the platform 30, thus forming three-dimensional patterns obviously (as shown in FIG. 5). Also, the cloth material 20 and the thermoplastic film 10 are combined tighter to form the thermoplastic composites with a varying shape to produce shoes, purses, and hats further.

It is to be noted that the pressing member 50 is comprised of the air insulation film 51 or the press mold 52. For example, when gaps of the cloth material 20 are large, the pressing member 50 is the air insulation film 51, and the heating unit 40 is fixed in the platform 30 or the press mold 52.

Figure 6:
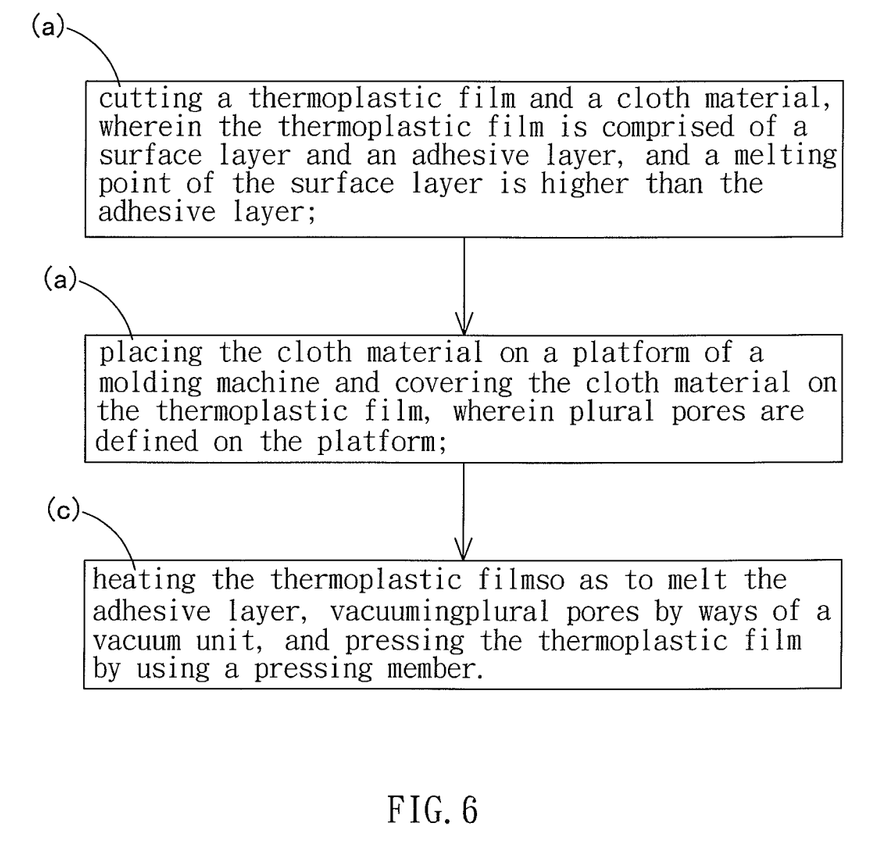
FIG. 6 is a flow chart of a method for forming thermoplastic composites according to a second embodiment of the present invention.
Figure 7:
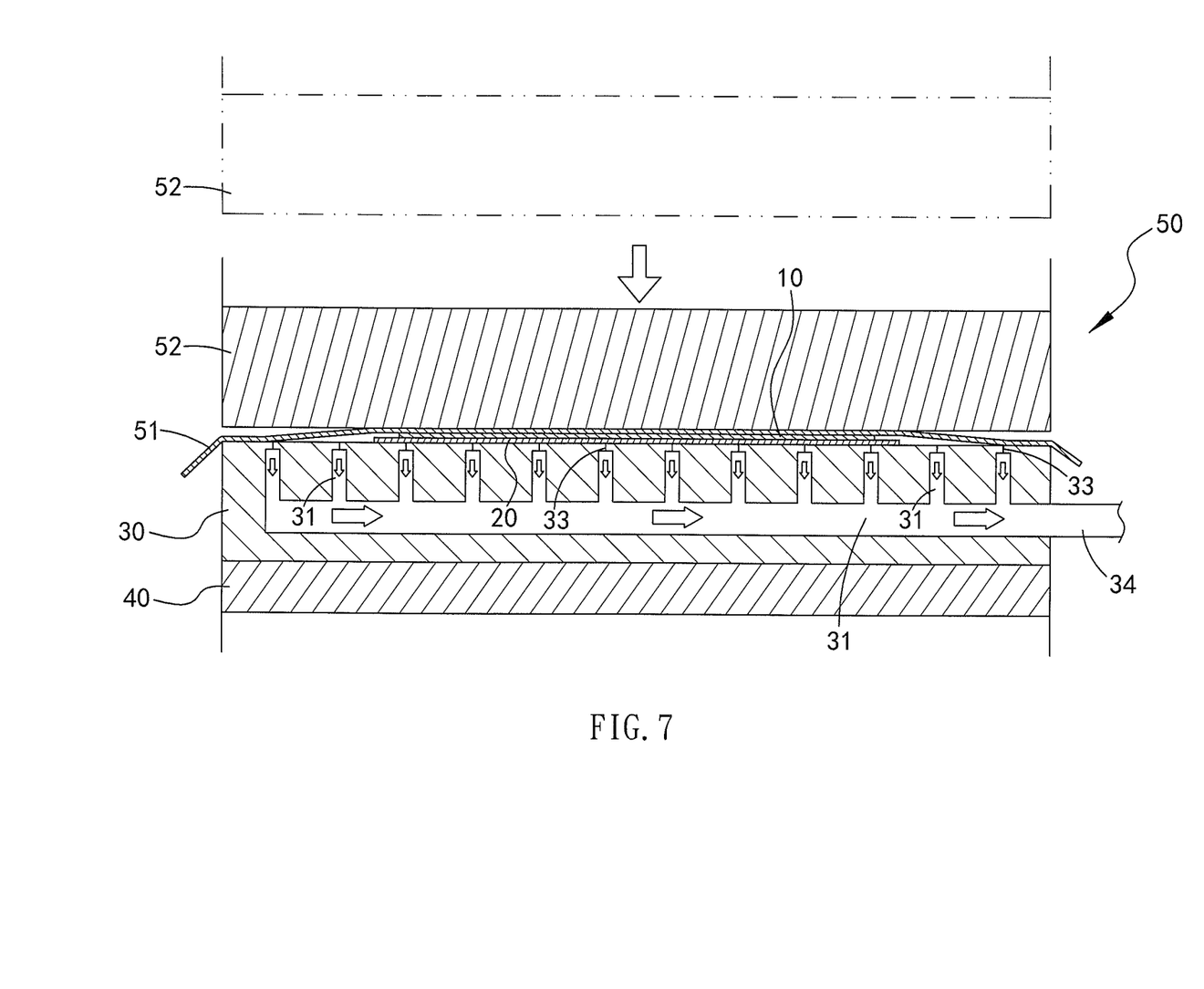
FIG. 7 is a cross sectional view showing the operation of the method for forming thermoplastic composites according to the second embodiment of the present invention.

Referring to FIGS. 6 and 7, a method for forming thermoplastic composites according to a second embodiment of the present invention contains the steps of:

(a). cutting a thermoplastic film 10 and a cloth material 20;

(b). placing the cloth material 20 on a platform 30 of a molding machine, and then putting an adhesive layer 12 of the thermoplastic film 10 on the cloth material 20, with the platform 30 including a plurality of channels 31 defined therein and plural pores 33 evenly formed on the top surface thereof and communicating with the plurality of channels 31; and (c). heating the thermoplastic film 10 by using a heating unit 40 to melt the adhesive layer 12, with air in the plurality of channels 31 drawn by a vacuum unit 34, and with a top surface of the thermoplastic film 10 pressed by a pressing member 50.

Thereby, when the vacuum unit 34 operates, a pressure between the top surface of the platform 30 and the air insulation film 51 is lower than atmospheric pressure and is a negative pressure to draw the air insulation film 51 downwardly. Thus, the air insulation film 51 presses the thermoplastic film 10, the press mold 52 presses the air insulation film 51, and the plural pores 33 draw the thermoplastic film 10 and the cloth material 20 downwardly, such that the adhesive layer 12 of the thermoplastic film 10 penetrates into the cloth material 20. Hence, the adhesive layer 12 adheres with the cloth material 20. In addition, the cloth material 20 and the thermoplastic film 10 are combined tighter to form the thermoplastic composites with a varying shape to produce shoes, purses, and hats further.

It is to be noted that the pressing member 50 is comprised of the air insulation film 51 or the press mold 52. For example, when gaps of the cloth material 20 are large, the pressing member 50 is the air insulation film 51, and the heating unit 40 is fixed in the platform 30 or the press mold 52.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for forming thermoplastic composites comprising:

(a). cutting a thermoplastic film and a cloth material, wherein the thermoplastic film is comprised of a surface layer and an adhesive layer, wherein a melting point of the surface layer is higher than the adhesive layer;

(b). placing the thermoplastic film of a size on a top surface of a platform of a molding machine, facing the adhesive layer upwardly, and covering the cloth material of a size on the thermoplastic film, with the size of the cloth material being larger than the size of the thermoplastic film, wherein the platform includes a plurality of channels defined therein, a plurality of concave and convex patterns arranged on the top surface, and plural pores evenly formed on the top surface and communicating with the plurality of channels;

(c). penetrating the adhesive layer of the thermoplastic film into the cloth material for adhering the adhesive layer with the cloth material by heating the thermoplastic film by using a heating unit to melt the adhesive layer and to soften the surface layer, pressing the cloth layer by an air insulation film located opposite to the adhesive layer, while drawing air in the plurality of channels by a vacuum unit, while the cloth layer is pressed by the air insulation film, and while the plural pores draw the thermoplastic film and the cloth material downwardly, and forming three-dimensional patterns with the surface layer of the thermoplastic film to correspond to the plurality of concave and convex patterns of the platform, wherein a melting point of the air insulation film is higher than the melting point of the surface layer, wherein the air insulation film has a size larger than the sizes of the thermoplastic film and the cloth material and larger than the top surface of the platform;

producing a pressure between the top surface of the platform and the air insulation film by the vacuum unit, wherein the pressure is lower than atmospheric pressure, and wherein the pressure is a negative pressure to draw the air insulation film downwardly, such that the air insulation film presses the cloth material; and while and after producing the pressure, pressing a press mold against the air insulation film toward the platform.

2. A method for forming thermoplastic composites comprising:
- (a). cutting a thermoplastic film and a cloth material, wherein the thermoplastic film has a size and is comprised of a surface layer and an adhesive layer, and wherein a melting point of the surface layer is higher than the adhesive layer;
- (b). placing the cloth material of a size on a top surface of a platform of a molding machine, and then putting the adhesive layer of the thermoplastic film on the cloth material, with the size of the cloth material being larger than the size of the thermoplastic film, wherein the platform includes a plurality of channels defined therein, and plural pores evenly formed on the top surface thereof and communicating with the plurality of channels; and
- (c). penetrating the adhesive layer of the thermoplastic film into the cloth material by heating the thermoplastic film by using a heating unit to melt the adhesive layer, pressing the surface layer by an air insulation film located opposite to the adhesive layer and drawing air in the plurality of channels by a vacuum unit, with the plural pores drawing the thermoplastic film and the cloth material downwardly, wherein the air insulation film has a size larger than the sizes of the thermoplastic film and the cloth material and larger than the top surface of the platform;

producing a pressure between the top surface of the platform and the air insulation film by the vacuum unit, wherein the pressure is lower than atmospheric pressure, and wherein the pressure is a negative pressure to draw the air insulation film downwardly, such that the air insulation film presses the cloth material; and while and after producing the pressure, pressing a press mold against the air insulation film toward the platform.

3. The method for forming thermoplastic composites as claimed in claim 1, wherein the heating unit is the press mold.

4. The method for forming thermoplastic composites as claimed in claim 2, wherein the heating unit is the press mold.

5. The method for forming thermoplastic composites as claimed in claim 1, wherein the heating unit is the platform.

6. The method for forming thermoplastic composites as claimed in claim 2, wherein the heating unit is the platform.

7. The method for forming thermoplastic composites as claimed in claim 3, wherein the air insulation film is covered on the platform, and wherein the press mold presses on the air insulation film.

8. The method for forming thermoplastic composites as claimed in claim 4, wherein the air insulation film is covered on the platform, and wherein the press mold presses on the air insulation film.

9. The method for forming thermoplastic composites as claimed in claim 1, further comprising extruding the thermoplastic film of thermoplastic polymeric material and colorant prior to cutting.

10. The method for forming thermoplastic composites as claimed in claim 2, further comprising extruding the thermoplastic film of thermoplastic polymeric material and colorant prior to cutting.

11. The method for forming thermoplastic composites as claimed in claim 9, wherein the thermoplastic polymeric material is selected from the group consisting of thermoplastic polyurethane (TPU) and styrene butadiene rubber (SBR), thermoplastic polyurethane (TPU) and styrene ethylene butylene styrene (SEBS), thermoplastic polyurethane (TPU) and thermoplastic rubber (TPR), thermoplastic polyurethane (TPU) and ethylene propylene diene monomer (EPDM), thermoplastic polyurethane (TPU) and thermoplastic polyurethane (TPU) hot melt adhesives and thermoplastic polyurethane (TPU) and Nylon elastomer.

12. The method for forming thermoplastic composites as claimed in claim 10, wherein the thermoplastic polymeric material is selected from the group consisting of thermoplastic polyurethane (TPU) and styrene butadiene rubber (SBR), thermoplastic polyurethane (TPU) and styrene ethylene butylene styrene (SEBS), thermoplastic polyurethane (TPU) and thermoplastic rubber (TPR), thermoplastic polyurethane (TPU) and ethylene propylene diene monomer (EPDM), thermoplastic polyurethane (TPU) and thermoplastic polyurethane (TPU) hot melt adhesives and thermoplastic polyurethane (TPU) and Nylon elastomer.

13. The method for forming thermoplastic composites as claimed in claim 1, wherein a color is printed, coated or surface sandwiched on the thermoplastic film.

14. The method for forming thermoplastic composites as claimed in claim 2, wherein a color is printed, coated or surface sandwiched on the thermoplastic film.

15. The method for forming thermoplastic composites as claimed in claim 1, wherein cutting the cloth material comprises cutting the cloth material selected from woven or knitted fabrics and non-woven and sandwich mesh.

16. The method for forming thermoplastic composites as claimed in claim 2, wherein cutting the cloth material comprises cutting the cloth material selected from woven or knitted fabrics and non-woven and sandwich mesh.

* * * * *